United States Patent
Yokota et al.

(10) Patent No.: US 9,388,752 B2
(45) Date of Patent: Jul. 12, 2016

(54) CONTROL SYSTEM FOR VEHICLE FOR CONTROLLING AN INTERNAL COMBUSTION ENGINE DURING TRANSMISSION GEAR SHIFTING

(71) Applicants: Atsuhiko Yokota, Gotenba (JP); Daichi Sakakibara, Susono (JP); Yoshio Hasegawa, Chiryu (JP); Keisuke Ota, Toyota (JP)

(72) Inventors: Atsuhiko Yokota, Gotenba (JP); Daichi Sakakibara, Susono (JP); Yoshio Hasegawa, Chiryu (JP); Keisuke Ota, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 14/409,907

(22) PCT Filed: Aug. 7, 2013

(86) PCT No.: PCT/IB2013/001864
§ 371 (c)(1),
(2) Date: Dec. 19, 2014

(87) PCT Pub. No.: WO2014/030058
PCT Pub. Date: Feb. 27, 2014

(65) Prior Publication Data
US 2015/0184599 A1   Jul. 2, 2015

(30) Foreign Application Priority Data

Aug. 23, 2012  (JP) ................................ 2012-184611

(51) Int. Cl.
*F02D 29/02* (2006.01)
*F02D 41/00* (2006.01)
(Continued)

(52) U.S. Cl.
CPC .............. *F02D 29/02* (2013.01); *B60W 10/06* (2013.01);
(Continued)

(58) Field of Classification Search
CPC ......... F02D 29/02; F02D 17/02; F02D 13/06; F02D 41/0087; F02D 41/0235; F02D 41/0002; F02D 41/023; F02D 11/105; F02D 2700/07; F02D 2200/0806; F02D 2011/102; F02D 2250/18; F16H 63/502; F01N 3/0871; F01N 3/0842; F01N 2240/36; B60W 30/19; B60W 10/11; B60W 10/06; B60W 2710/0666; B60W 2710/0605; B60W 2510/0604; B60Y 2300/432; B60Y 2300/435; Y02T 10/42
USPC ........ 123/406, 198 F, 198 DB; 701/101, 102, 701/103, 104, 113
See application file for complete search history.

(56) References Cited

U.S. PATENT DOCUMENTS 5,947,863 A * 9/1999 Grob ..................... B60W 10/06
477/102

(Continued)

FOREIGN PATENT DOCUMENTS

DE   10 2006 005 446   8/2007
EP   0 849 110         6/1998
(Continued)

OTHER PUBLICATIONS

Office Action issued Jun. 27, 2014 in Japanese Application No. 2012-184611 (submitting partial English language translation only).

(Continued)

*Primary Examiner* — Grant Moubry
(74) *Attorney, Agent, or Firm* — Oblon, McClelland, Maier & Neustadt, L.L.P (57) ABSTRACT

A control system for a vehicle performs torque down control to reduce torque of an engine by cutting off supply of fuel to at least one of the cylinders of the engine during an inertia phase of a power-on upshift. During the torque down control, the throttle opening is reduced to smaller than a throttle opening including an amount by which the throttle opening is increased so as to compensate for a part of the amount of torque reduction, by means of one or more cylinders to which the fuel continues to be supplied.

6 Claims, 6 Drawing Sheets

(51) Int. Cl.
*B60W 10/11* (2012.01)
*B60W 10/06* (2006.01)
*F02D 41/02* (2006.01)
*F02D 11/10* (2006.01)
*F02D 17/02* (2006.01)
*B60W 30/19* (2012.01)
*F16H 63/50* (2006.01)
*F01N 3/08* (2006.01)

(52) U.S. Cl.
CPC ............... *B60W 10/11* (2013.01); *B60W 30/19* (2013.01); *F02D 11/105* (2013.01); *F02D 17/02* (2013.01); *F02D 41/0002* (2013.01); *F02D 41/0087* (2013.01); *F02D 41/023* (2013.01); *F02D 41/0235* (2013.01); *F16H 63/502* (2013.01); *B60W 2710/0666* (2013.01); *B60Y 2300/432* (2013.01); *B60Y 2300/435* (2013.01); *F01N 3/0842* (2013.01); *F01N 3/0871* (2013.01); *F01N 2240/36* (2013.01); *F02D 2011/102* (2013.01); *F02D 2200/0806* (2013.01); *F02D 2250/18* (2013.01); *F02D 2700/07* (2013.01); *Y02T 10/42* (2013.01)

(56) References Cited

U.S. PATENT DOCUMENTS

| | | | |
|---|---|---|---|
| 6,745,747 B2* | 6/2004 | Surnilla | F01N 3/0842 123/198 F |
| 7,146,966 B2* | 12/2006 | Nakamura | F01L 1/185 123/198 DB |
| 7,571,711 B2* | 8/2009 | Sato | F02D 9/02 123/350 |
| 8,157,035 B2* | 4/2012 | Whitney | B60K 6/365 180/65.265 |
| 8,214,127 B2* | 7/2012 | Whitney | F02D 11/105 123/198 F |
| 8,596,041 B2* | 12/2013 | Tsukamoto | F02D 41/0005 60/273 |
| 2010/0082220 A1 | 4/2010 | Whitney et al. | |
| 2012/0060479 A1 | 3/2012 | Tsukamoto et al. | |

FOREIGN PATENT DOCUMENTS

| | | |
|---|---|---|
| EP | 1 413 724 | 4/2004 |
| JP | 2 291434 | 12/1990 |
| JP | 10 59022 | 3/1998 |
| JP | 11 107797 | 4/1999 |
| JP | 2007 92609 | 4/2007 |
| JP | 2009 162163 | 7/2009 |

OTHER PUBLICATIONS

International Search Report Issued Jan. 9, 2014 in PCT/IB13/001864 Filed Aug. 7, 2013.

* cited by examiner

CONTROL SYSTEM FOR VEHICLE FOR CONTROLLING AN INTERNAL COMBUSTION ENGINE DURING TRANSMISSION GEAR SHIFTING

BACKGROUND OF THE INVENTION

1. Field of the Invention

The invention relates to a control system for a vehicle which performs shift control of an automatic transmission, and particularly relates to a technology of performing engine torque down control through fuel cut control during an inertia phase of a power-on upshift.

2. Description of Related Art

In a vehicle including an engine having a plurality of cylinders, and an automatic transmission that transmits power from the engine toward driving wheels, it is well known to perform engine torque down control for cancelling inertia torque during an inertia phase of an upshift while the accelerator pedal is being depressed (namely, a power-on upshift) so as to suppress shift shocks. For example, a shift control system for an automatic transmission as described in Japanese Patent Application Publication No. 10-59022 (JP 10-59022 A) is used in this type of vehicle. In JP 10-59022 A, as a method of increasing the amount of torque reduction during the inertia phase as a target gradient of the input shaft speed of the transmission is larger (namely, as the shift speed is higher), it is proposed to reduce torque by cutting off fuel supply to at least one of the cylinders of the engine (performing fuel cut control), instead of retarding the ignition timing of the engine, when the shift speed is high. In recent years, the automatic transmission may be desired or required to be sharply (or quickly) shifted up or down in some cases, and the above-described method is useful in such cases.

In the meantime, under the fuel cut control performed on a part of the cylinders (which will be called "partial fuel cut control"), intake and exhaust valves of the engine and pistons received in the cylinders keep operating or moving, unlike cylinder de-activation control; therefore, under the partial fuel cut control in the case of a power-on upshift, in particular, air is fed into a catalyst provided in an exhaust pipe of the engine. As a result, exhaust gas that flows into the catalyst has a lean air-fuel ratio (large A/F), and it may become difficult for the catalyst to convert or remove NOx, in a system that reduces nitrogen oxides (NOx) utilizing the engine operation at the stoichiometric air-fuel ratio (stoichiometric A/F) in combination with the three-way catalyst. In another point of view, driving force that meets a requirement needs to be produced in a power-on upshift. When the partial fuel cut control is performed, the torque may be excessively reduced since the amount of torque reduction can only be increased in steps on a cylinder basis. In view of this possibility, it is considered to increase the throttle opening so as to make up (compensate) for at least a part of the torque reduction amount, using one or more cylinders to which the fuel continues to be supplied. As a result, a larger amount of air is fed into the catalyst via the cylinders from which the fuel is cut off, and it may become difficult for the catalyst to convert or remove NOx. The above-described problem has not been publicly known, and it has not been proposed to curb deterioration of emissions when the partial fuel cut control is performed.

SUMMARY OF THE INVENTION

The invention provide a control system for a vehicle, which can reduce an influence on emissions when engine torque is reduced by cutting off fuel supply to at least one cylinder of the engine during an inertia phase of a power-on upshift.

According to a first aspect of the invention, a control system for a vehicle including an engine having a plurality of cylinders, a catalyst provided in an exhaust pipe of the engine, and an automatic transmission that transmits power from the engine toward driving wheels is provided, the system includes an electronic control unit configured to perform torque down control to reduce torque of the engine by cutting off fuel supply to at least one of the cylinders of the engine during an inertia phase of a power-on upshift. The electronic control unit is configured to reduce a throttle opening during execution of the torque down control until the throttle opening becomes smaller than that before the torque down control is executed, or until the throttle opening becomes smaller than a throttle opening including an amount by which the throttle opening is increased so as to compensate for a part of an amount of torque reduction, by the fuel supply to which at least one of the cylinders is continued during the torque down control.

According to the first aspect of the invention, even if the engine torque is reduced by cutting off fuel supply to at least one of the cylinders during the inertia phase of the power-on upshift, the amount of air fed into the catalyst via the cylinder(s) from which the fuel is cut off is reduced, as compared with the case where the control for reducing the throttle opening during execution of the torque down control is not performed; therefore, the gas flowing into the catalyst is less likely to be in a lean state. Accordingly, an influence on the emissions can be reduced when the engine torque is reduced by cutting off the fuel supply to at least one of the cylinders of the engine during the inertia phase of the power-on upshift.

In the control system according to the first aspect of the invention, the catalyst may be a catalyst that temporarily stores nitrogen oxides in a lean air-fuel ratio region, and the electronic control unit may be configured to reduce the throttle opening by a larger degree during execution of the torque down control as an amount of nitrogen oxides deposited on the catalyst is larger. With this arrangement, when the amount of nitrogen oxides deposited on the catalyst is large, the electronic throttle valve can be controlled so that the gas flowing into the catalyst does not become leaner.

In the control system according to the first aspect of the invention, the electronic control unit may be configured to perform the control for reducing the throttle opening during execution of the torque down control when an amount of nitrogen oxides deposited on the catalyst is larger than a given value, and the electronic control unit may be configured not to perform the control for reducing the throttle opening during execution of the torque down control when the amount of nitrogen oxides deposited on the catalyst is equal to or smaller than the given value. With this arrangement, when the amount of nitrogen oxides deposited on the catalyst is small, an influence on the emissions can be reduced even if the control for reducing the throttle opening during execution of the torque down control is not performed, since a large amount of nitrogen oxides can be adsorbed by the catalyst. In addition, when the amount of nitrogen oxides deposited on the catalyst is small, the throttle opening may be kept constant or increased so as to compensate for at least a part of the amount of torque reduction due to fuel cut-off, by means of the cylinder or cylinders to which the fuel continues to be supplied; therefore, shocks, which would otherwise occur due to excessive torque reduction, can be alleviated.

In the control system according to the first aspect of the invention, the electronic control unit may be configured to start the control for reducing the throttle opening during execution of the torque down control before the torque down control is started, and may be configured to finish the control for reducing the throttle opening during execution of the torque down control after the torque down control is finished. In this connection, the occurrence of the inertia torque may not be timed with the torque down control, and large torque variations may occur to the output torque, due to control variations in the torque down control through fuel cut-off, or a response delay in the actual torque reduction. In view of this possibility, the throttle opening is reduced and increased (e.g., the throttle valve is closed and opened) before and after the torque down control is performed; therefore, torque variations due to torque reduction through fuel cut-off are reduced, and shocks can be alleviated.

According to a second aspect of the invention, a control method for a vehicle including an engine having a plurality of cylinders, a catalyst provided in an exhaust pipe of the engine, and an automatic transmission that transmits power from the engine toward driving wheels, the method includes reducing a torque of the engine by cutting off fuel supply to at least one of the cylinders of the engine during an inertia phase of a power-on upshift, reducing a throttle opening during reducing the torque until the throttle opening becomes smaller than that before reducing the torque, or until the throttle opening becomes smaller than a throttle opening including an amount by which the throttle opening is increased so as to compensate for a part of an amount of torque reduction, by the fuel supply to which at least one of the cylinders is continued during the reducing the torque.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The automatic transmission included in the vehicle for which the control system of the invention is used may be preferably selected from, for example, a known planetary gear type automatic transmission in which a selected one of a plurality of gear positions is established, a known synchromesh two-parallel-shaft type automatic transmission in which a selected one of plural pairs of speed change gears that are provided between two shafts and constantly mesh with each other is brought into a power transmitting state by means of a synchronizer driven by an actuator, so that the gear position or gear ratio is automatically changed, a so-called DCT (Dual Clutch Transmission) as one type of synchromesh two-parallel-shaft type automatic transmission, which has two input shafts that provide two transmission paths, and clutches connected to the respective input shafts to establish the even gears and the odd gears, respectively, a known belt-and-pulley type continuously variable transmission or traction type continuously variable transmission of which the speed ratio is continuously or steplessly changed, and a known electric continuously variable transmission of which the speed ratio is electrically changed. Needless to say, the continuously variable transmission of each of the above-indicated types may be subjected to shift control for changing the speed ratio so as to provide a finite number of discrete speed ratios. The automatic transmission may be installed transversely on a vehicle, such as a FF (front-engine, front-drive) vehicle, such that the axis of the automatic transmission extends in the width direction of the vehicle, or may be installed longitudinally on a vehicle, such as a FR (front-engine, rear-drive) vehicle, such that the axis of the automatic transmission extends in the longitudinal direction of the vehicle.

Preferably, the engine included in the vehicle for which the control system of the invention is used may be selected from a wide variety of internal combustion engines, such as a gasoline engine and a diesel engine, which generate power by burning fuel, for example.

A first embodiment of the invention will be described in detail with reference to the drawings.

Figure 1:
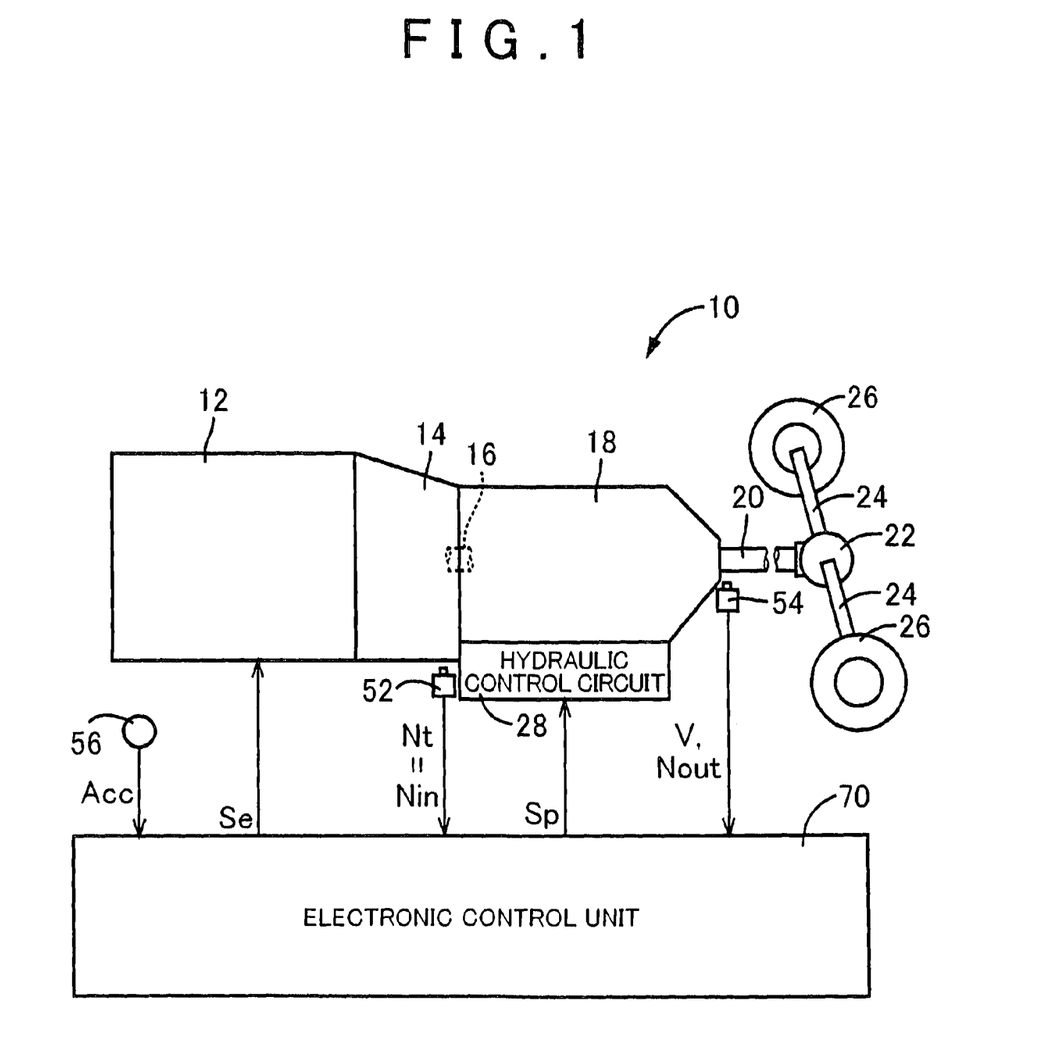
FIG. 1 is a view illustrating the schematic construction of a power transmission path in a vehicle to which the invention is applied, and also explaining a principal part of a control system provided in the vehicle.
Figure 2:
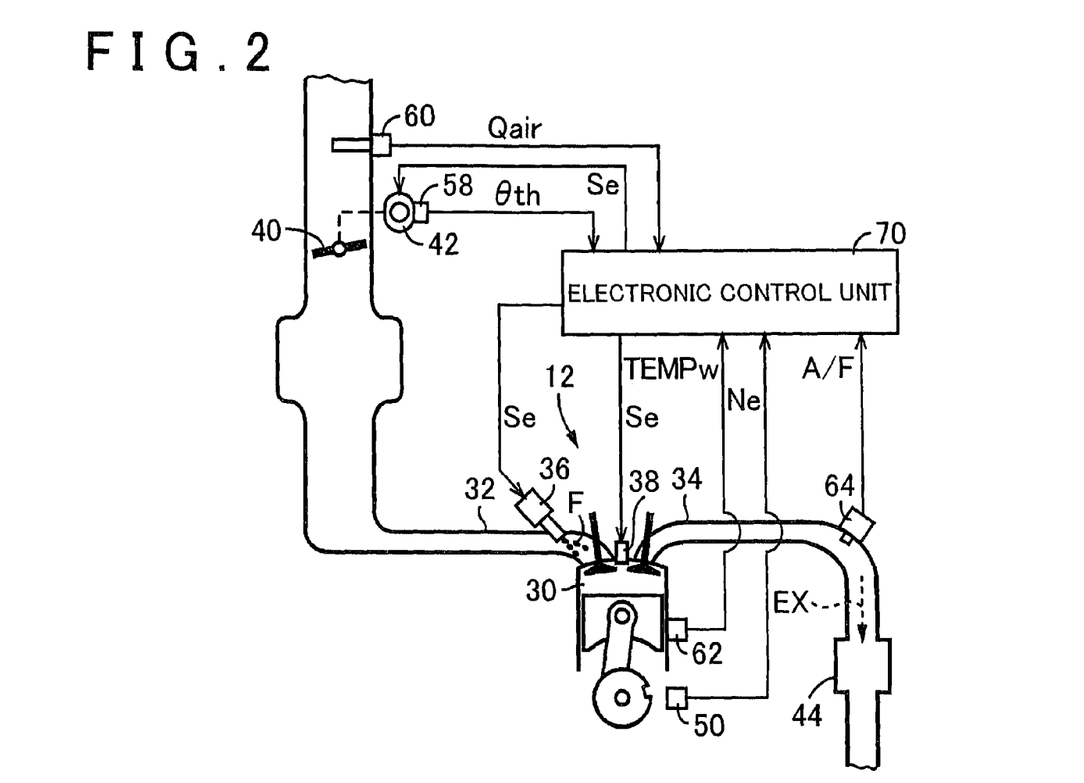
FIG. 2 is a view illustrating the schematic construction of an engine of FIG. 1, and also explaining a principal part of the control system provided in the vehicle for executing output control of the engine.

FIG. 1 illustrates the schematic construction of a power transmission path from an engine 12 to driving wheels 26, which is included in a vehicle 10 to which the invention is applied. FIG. 1 is also useful for explaining a principal part of a control system provided in the vehicle 10. FIG. 2 illustrates the schematic construction of the engine 12 of FIG. 1, and is also useful for explaining a principal part of the control system provided in the vehicle 10 for executing output control of the engine 12, for example. In FIG. 1 and FIG. 2, power generated by the engine 12 as a driving power source is received by an input shaft 16 of the automatic transmission 18 via a torque converter 14, and then transmitted from an output shaft 20 of the automatic transmission 18 to the right and left driving wheels 26, via a differential gear device 22, a pair of axles or drive shafts 24, and so forth.

The automatic transmission 18 provides a part of the power transmission path from the engine 12 to the driving wheels 26, and transmits power from the engine 12 toward the driving wheels 26. The automatic transmission 18 is, for example, a known planetary gear type automatic transmission in which gears are shifted by engaging or releasing one or more of a plurality of coupling devices (such as brakes and clutches), so that a selected one of a plurality of gears (gear positions) is established. Namely, the automatic transmission 18 is a stepwise variable transmission that performs so-called clutch-to-clutch shifting, and is operable to change the speed of rotation of the input shaft 16 and deliver the resulting rotary power from the output shaft 20. The input shaft 16 is also a turbine shaft that is rotated or driven by a turbine wheel of the torque converter 14. The above-indicated plurality of coupling devices are hydraulic friction devices, such as clutches and brakes, of which engaging and releasing are respectively controlled by a hydraulic control circuit 28. More specifically, the torque capacity, or engaging force, of each of the friction devices is changed by regulating the pressures of solenoid valves, etc. in the hydraulic control circuit 28, so that gear elements between which the friction device is interposed are selectively coupled to each other.

Referring to FIG. 2, the engine 12 is a known automotive gasoline engine having a plurality of cylinders, for example, and includes an intake pipe 32 connected to an intake port of a combustion chamber 30, an exhaust pipe 34 connected to an exhaust port of the combustion chamber 30, a fuel injection device 36 that injects and supplies fuel F to an intake air drawn into the combustion chamber 30, and an ignition device 38 that ignites an air-fuel mixture in the combustion chamber 30, which mixture consists of the fuel F injected and supplied by the fuel injection device 36, and the air drawn into the combustion chamber 30.

An electronic throttle valve 40 is provided in the intake pipe 32 of the engine 12, and the electronic throttle valve 40 is operated to be opened and closed by a throttle actuator 42. In the engine 12, the fuel F is injected from the fuel injection device 36 and supplied to the intake air drawn from the intake pipe 32 into the combustion chamber 30, to form an air-fuel mixture, and the air-fuel mixture is ignited by the ignition device 38 and burned in the combustion chamber 30. As a result, the engine 12 is driven, and the air-fuel mixture that has been burned is discharged as exhaust gas EX into the exhaust pipe 34.

A catalyst 44 is provided in the exhaust pipe 34 of the engine 12. The exhaust gas EX produced through combustion in the engine 12 flows into the catalyst 44 through the exhaust pipe 34, and is cleaned by the catalyst 44 and discharged into the atmosphere. The catalyst 44 includes a well-known three-way catalyst that removes or converts hydrocarbon (HC), carbon monoxide (CO), nitrogen oxides (NOx), etc., contained in the exhaust gas EX, for example.

The vehicle 10 is provided with an electronic control unit 70 including controllers associated with output control of the engine 12, for example. The electronic control unit 70 includes a so-called microcomputer having CPU, RAM, ROM, input/output interfaces, etc., for example, and the CPU performs signal processing according to programs stored in advance in the ROM, while utilizing the temporary storage function of the RAM, so as to carry out various controls of the vehicle 10. For example, the electronic control unit 70 performs output control of the engine 12, shift control of the automatic transmission 18, and so forth, and may be divided as needed into a subunit for engine control, a subunit for hydraulic control (shift control), and so forth. Also, the electronic control unit 70 receives various signals detected by various sensors. The various sensors include, for example, rotational speed sensors 50, 52, 54, accelerator pedal position sensor 56, throttle position sensor 58, air flow meter (intake air amount sensor) 60, water temperature sensor 62, and an air-fuel ratio sensor 64. The above-indicated various signals include, for example, the engine speed Ne representing the revolution speed of the engine 12, turbine speed Nt or transmission input shaft speed Nin representing the rotational speed of the input shaft 16, transmission output shaft speed Nout representing the rotational speed of the output shaft 20 corresponding to the vehicle speed V, accelerator operation amount Acc representing the amount of driving force (driving torque) of the vehicle 10 required by the driver, throttle opening 0th representing the angle of opening of the electronic throttle valve 40, intake air amount Qair of the engine 12, coolant temperature TEMPw of the engine 12, and the air-fuel ratio A/F (i.e., ante-catalyst A/F) of exhaust gas EX (i.e., exhaust gas EX flowing into the catalyst) on the upstream side of the catalyst 44. Also, the electronic control unit 70 outputs an engine output control command signal Se for use in output control of the engine 12, a hydraulic command signal Sp for operating the hydraulic control circuit 28 configured to control hydraulic actuators of the automatic transmission 18, and so forth.

Figure 3:
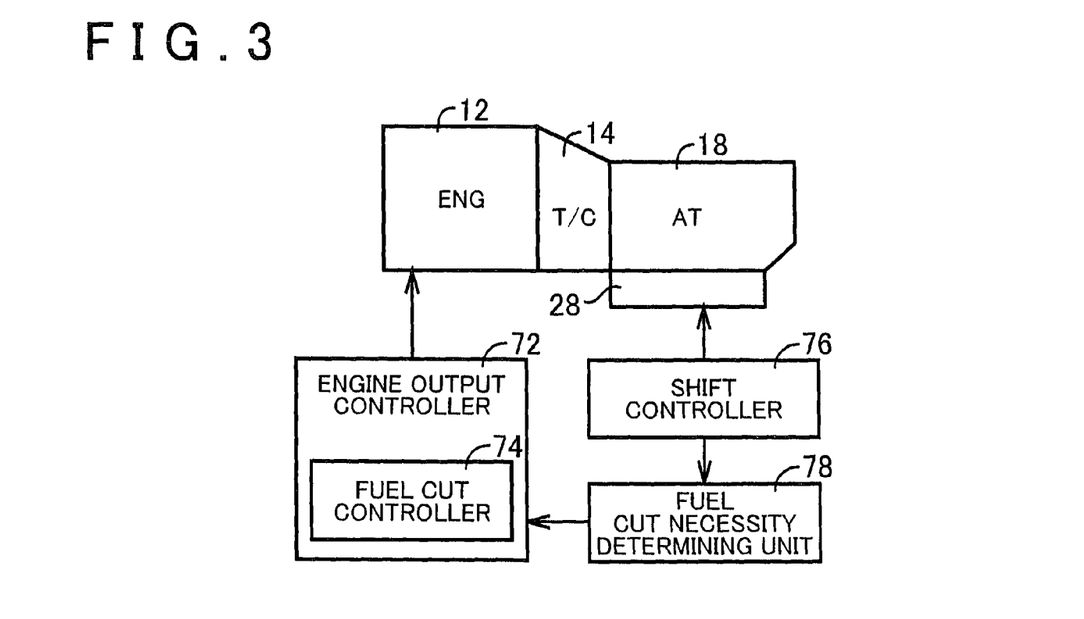
FIG. 3 is a functional block diagram useful for explaining principal control functions of an electronic control unit.

FIG. 3 is a functional block diagram useful for explaining principal control functions performed by the electronic control unit 70. In FIG. 3, an engine output controller 72 outputs an engine output control command signal Se so as to control opening/closing of the electronic throttle valve 40 by means of the throttle actuator 42, for throttle control, control the amount of fuel injected by the fuel injection device 36, for control of fuel supply to each cylinder of the engine 12, and control the ignition device 38 for ignition timing control, so that the required engine torque Te (which will be called "required engine torque Tedem"), for example, is obtained. The engine output controller 72 calculates the required driving force Fdem, based on the actual accelerator operation amount Acc and the vehicle speed V, from a pre-stored relationship (driving force map) (not shown) between the vehicle speed V and the required driving force Fdem, using the accelerator operation amount Acc as a parameter, for example. Then, the engine output controller 72 calculates the required engine torque Tedem that provides the required driving force Fdem, based on the effective radius of the tires of the driving wheels 26, the gear ratio in the current gear position of the automatic transmission 18, the final reduction ratio in a power transmission path closer to the driving wheels 26 than the output shaft 20, and the torque ratio t of the torque converter 14. The torque ratio t of the torque converter 14 is calculated based on the actual speed ratio e, from pre-stored known relationships (a diagram indicating operating characteristics of the torque converter 14) among the speed ratio (=turbine speed Nt/pump speed cop (engine speed Ne)) and the torque ratio t, efficiency, and the capacity coefficient. The engine output controller 72 functionally includes a fuel cut controller 74 that performs fuel cut control for cutting off supply of the fuel to one or more cylinders of the engine 12, when the engine speed Ne, etc. satisfy certain conditions, during deceleration of the vehicle 10, for example.

A shift controller 76 performs shift control of the automatic transmission 18. More specifically, the shift controller 76 makes a shift determination, based on vehicle conditions indicated by the actual vehicle speed V and the accelerator operation amount Acc, from a pre-stored known relationship (shift map, shift diagram) using the vehicle speed V and the accelerator operation amount Acc as variables. Then, when the shift controller 76 determines that the automatic transmission 18 should be shifted up or down, the automatic shift control of the automatic transmission 18 is performed so that the automatic transmission 18 is shifted to the gear position that should be established. For example, the shift controller 76 outputs a hydraulic command signal Sp for engaging and/or releasing the coupling device(s) associated with shifting of the automatic transmission 18, to the hydraulic control circuit 28, so as to establish the gear position thus determined.

As an effective method for reducing the shift time during a power-on upshift effected by the shift controller 76, engine torque down control for reducing engine torque so as to cancel inertia torque during an inertia phase is performed. The required torque reduction amount, i.e., the required amount by which torque is reduced under the engine torque down control, is larger as a target value of change in the transmission input shaft speed Nin during, the inertia phase, i.e., a target value of the gradient of the input shaft speed, is larger. If the torque reduction amount is relatively small, the required torque reduction amount can be achieved by reducing torque through ignition timing retard control of the engine 12. If, on the other hand, the torque reduction amount is relatively large, the required torque reduction amount cannot be achieved through the ignition timing retard control; therefore, it is useful to reduce torque through fuel cut control performed by the fuel cut controller 74.

The fuel cut control may be roughly classified into partial fuel cut control under which supply of the fuel to a part of the cylinders is cut off, according to the torque reduction amount, and all-cylinder fuel cut control under which supply of the fuel to all of the cylinders is cut off. In the partial fuel cut control, exhaust gas EX emitted from one or more cylinders (combustion cylinder(s)) to which the fuel continues to be supplied, and air emitted from one or more cylinders (fuel cut-off cylinder(s)) to which the fuel is inhibited from being supplied are fed into the catalyst 44. As a result, the air-fuel ratio A/F of the gas flowing into the catalyst 44 becomes lean, which may make it difficult for the catalyst 44 to convert or remove NOx. Also, since a large quantity of air flows into the catalyst 44, deterioration of the catalyst 44 may proceed. In another respect, the partial fuel cut control only permits the torque reduction amount to be changed in steps on a cylinder basis. Therefore, when some driving force is required as in the case of power-on upshifts, the torque may be excessively reduced. In this case, the engine output controller 72 increases the throttle opening θth so as to make up or compensate for at least a part of the torque reduction amount under the fuel cut control by the fuel cut controller 74, by means of the combustion cylinders. As a result, a larger quantity of air is fed into the catalyst 44 via the fuel cut-off cylinders, which may make it difficult for the catalyst 44 to convert or remove NOx.

Thus, in this embodiment, the throttle opening θth during execution of torque down control through the partial fuel cut control during the inertia phase of the power-on upshift is made smaller than that before execution of the torque down control, or is made smaller a throttle opening θth that includes an increase of the throttle opening θth which enables the combustion cylinders to compensate for at least a part of the torque reduction amount under the fuel cut control, so as to reduce an influence on the emissions when the torque down control is executed through the partial fuel cut control during the inertia phase of the power-on upshift.

In the meantime, when the fuel cut control is executed, a large torque change occurs. Meanwhile, control variations may arise in the fuel cut control, and the actual torque reduction may occur with a response delay. Therefore, the occurrence of the inertia torque may not be timed with the actual torque reduction, and large torque variations may occur to the output torque. Thus, in this embodiment, in order to reduce torque variations due to torque reduction through the fuel cut control, control for reducing the throttle opening θth during execution of the torque down control is started before the torque starts being reduced under the partial fuel cut control, and the control for reducing the throttle opening θth during execution of the torque down control is finished after the end of the torque reduction.

More specifically described with reference to FIG. 3, a fuel cut necessity determining unit 78 determines whether the fuel cut controller 74 needs to perform partial fuel cut control, during an inertia phase of a power-on upshift effected by the shift controller 76. For example, the fuel cut necessity determining unit 78 determines that the fuel cut controller 74 needs to perform the partial fuel cut control, when a target value of change of the transmission input shaft speed Nin (i.e., the gradient of the input shaft speed) as one example of element that can express the shift time is equal to or larger than a predetermined gradient as a gradient of the input shaft speed that requires at least the partial fuel cut control. The shift controller 76 calculates the target value of the gradient of the input shaft speed, based on the transmission input shaft speed Nin at the time when shifting is determined, the gear positions (gears) between which the transmission is shifted, and the accelerator operation amount Acc, for example.

If the fuel cut necessity determining unit 78 determines that the partial fuel cut control needs to be performed during the inertia phase of the power-on upshift, the engine output controller 72 executes control for reducing the throttle opening θth during execution of torque down control through the fuel cut control. For example, the engine output controller 72 makes the throttle opening θth equal to zero (i.e., fully closes the electronic throttle valve 40) during execution of torque down control in the inertia phase. When the throttle opening θth is increased so as to compensate for at least a part of the amount of torque reduction through the fuel cut control, by means of the combustion cylinders, the engine output controller 72 reduces the amount of increase of the throttle opening θth. Namely, the engine output controller 72 reduces the throttle opening θth during the inertia phase, to be smaller than the throttle opening θth to which the increase of the throttle opening θth calculated as the required compensation amount has been added.

Preferably, the engine output controller 72 starts the control for reducing the throttle opening θth during execution of torque down control through the fuel cut control, before the fuel cut controller 74 starts the fuel cut control, and finishes the same control after the fuel cut control is finished. For example, the engine output controller 72 starts the control for reducing the throttle opening θth during execution of torque down control through the fuel cut control, when a predetermined elapsed time elapses from the actual shift determination time at which the shift is determined. The predetermined elapsed time is set as an elapsed time from the shift determination time, at which the engine output controller 72 starts generating a command value of the throttle opening θth so that the actual throttle opening θth would have already been reduced at the time when the fuel cut control is started, in view of a response delay of the actual value with respect to the command value of the throttle opening θth.

Figure 4:
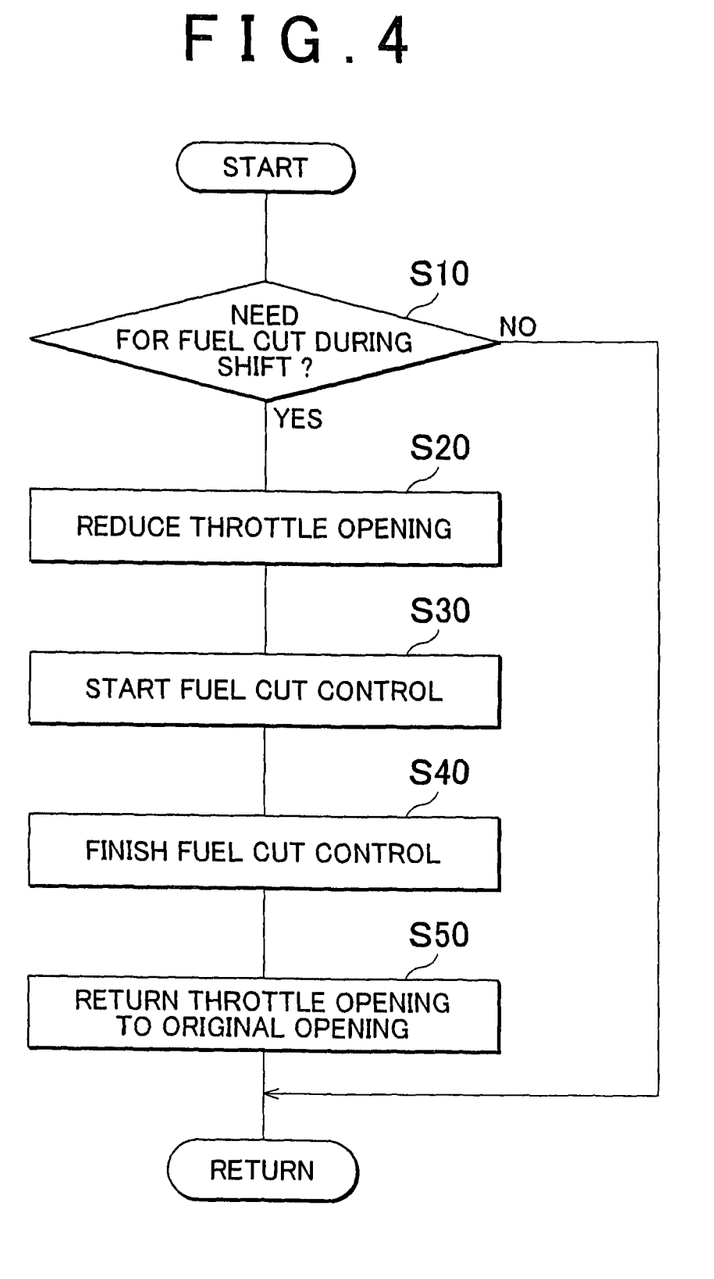
FIG. 4 is a flowchart explaining a principal part of control operations of the electronic control unit, namely, explaining control operations for reducing an influence on emissions when engine torque is reduced through partial fuel cut control during an inertia phase of a power-on upshift.
Figure 5:
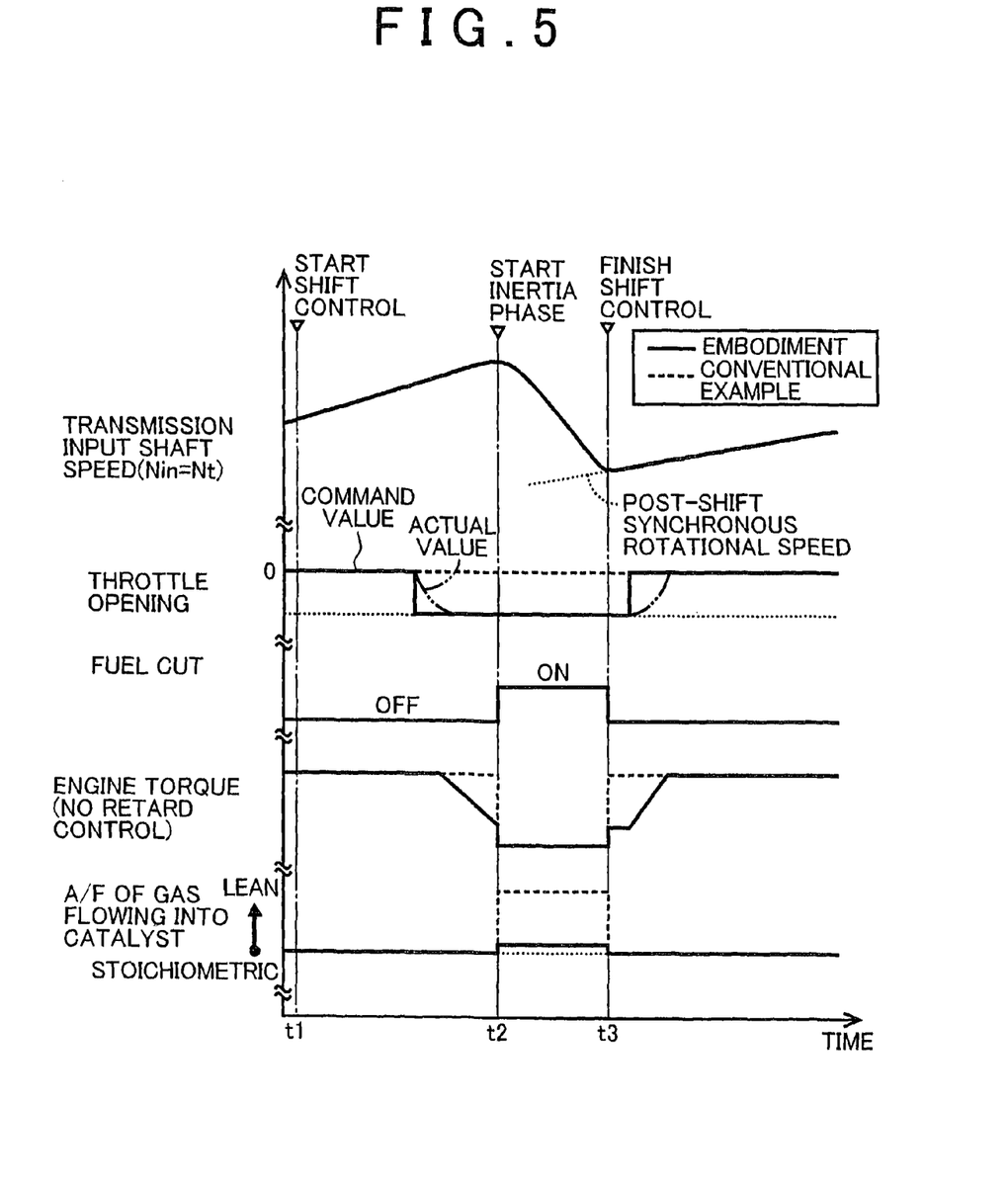
FIG. 5 is a time chart when the control operations indicated in the flowchart of FIG. 4 are carried out, showing one example in which the throttle opening during execution of torque down control is reduced to be smaller than that before execution of the torque down control.
Figure 6:
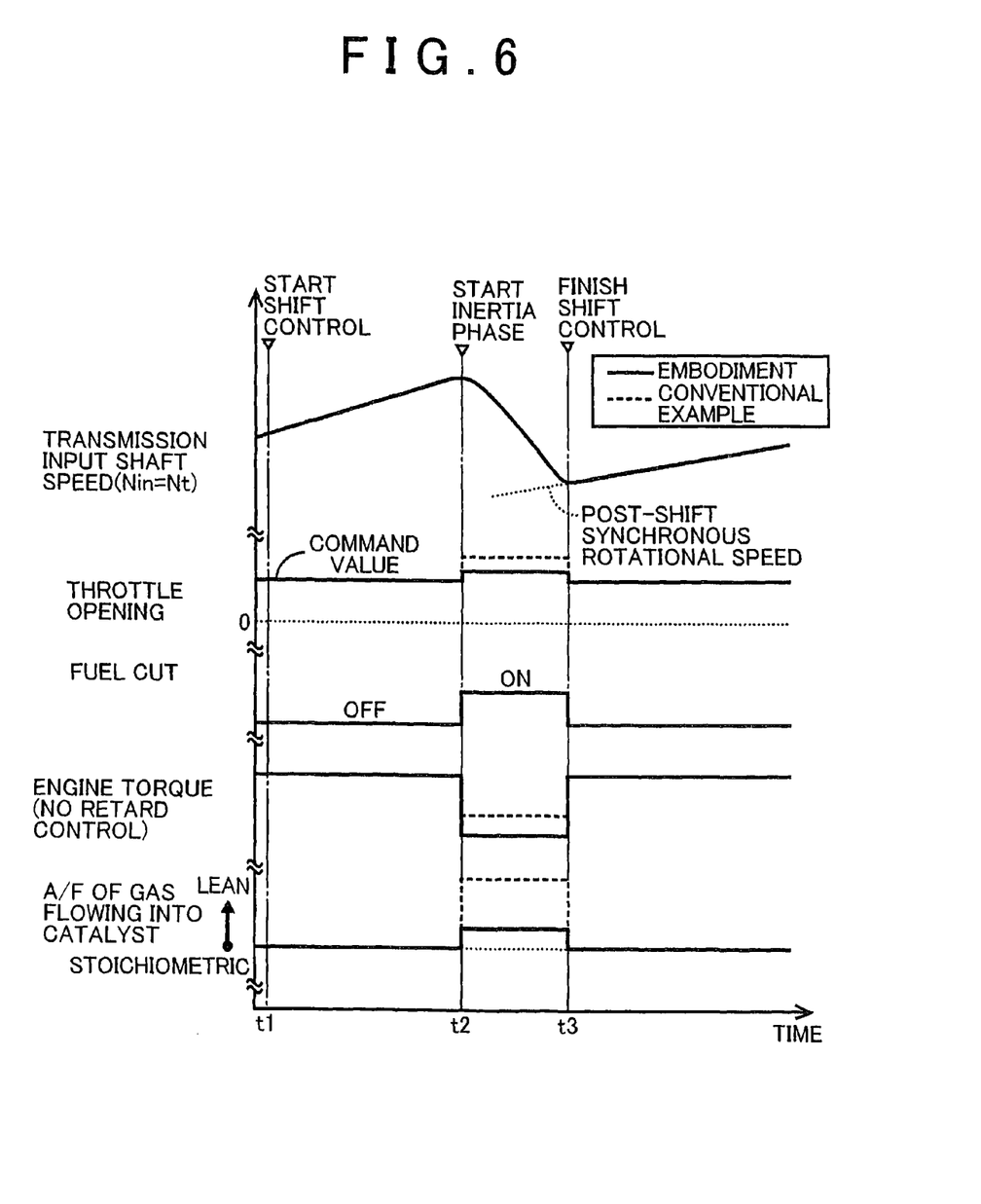
FIG. 6 is a time chart when the control operations indicated in the flowchart of FIG. 4 are carried out, showing one example in which the throttle opening during execution of torque down control is reduced to be smaller than a throttle opening including an amount of compensation by combustion cylinders.

FIG. 4 is a flowchart explaining a principal part of control operations of the electronic control unit 70, namely, control operations for reducing an influence on the emissions when partial fuel cut control is performed during an inertia phase of a power-on upshift, so as to reduce engine torque. The control flow of FIG. 4 is repeatedly executed in short cycles of, for example, several milliseconds to several tens of milliseconds. FIG. 5 is a time chart when the control operations indicated in the flowchart of FIG. 4 are carried out, and shows one example in which the throttle opening θth during execution of torque down control is reduced to be smaller than that before execution of torque down control. FIG. 6 is a time chart when the control operations indicated in the flowchart of FIG. 4 are carried out, and shows one example in which the throttle opening θth during execution of torque down control is reduced to be smaller than the throttle opening θth including an amount by which the throttle opening θth is increased so as to compensate for a part of the torque reduction amount, by means of the combustion cylinders.

In FIG. 4, it is initially determined in step S10 corresponding to the fuel cut necessity determining unit 78 whether partial fuel cut control needs to be performed during an inertia phase of a power-on upshift, for example. Namely, it is determined whether the partial fuel cut control is performed during the inertia phase of the power-on upshift. If a negative decision (NO) is made in step S10, the current cycle of this routine ends. If an affirmative decision (YES) is made in step S10 (at time t1 in FIG. 5 and FIG. 6), step S20 corresponding to the engine output controller 72 is executed to perform control for reducing the throttle opening θth during execution of torque down control through the partial fuel cut control (see the solid line relative to the broken line between time t2 and time t3 in FIG. 5 and FIG. 6). Then, in step S30 corresponding to the fuel cut controller 74, the partial fuel cut control is started (at time t2 in FIG. 5 and FIG. 6). Then, in step S40 corresponding to the fuel cut controller 74, the partial fuel cut control is finished (at time t3 in FIG. 5 and FIG. 6). Then, in step S50 corresponding to the engine output controller 72, the control started in the above step S20 for reducing the throttle opening θth is finished, so that the throttle opening θth is returned to the original opening (after t3 in FIG. 5 and FIG. 6).

In FIG. 5, when partial fuel cut control is performed during an inertial phase of a power-on upshift, for example, the throttle opening θth is kept constant even during the partial fuel cut control, in a conventional example indicated by broken lines. On the other hand, in this embodiment indicated by solid lines, the throttle opening θth is made equal to zero (i.e., the electronic throttle valve 40 is fully closed) during the partial fuel cut control. As a result, the amount of air fed to the catalyst 44 is significantly reduced, and the air-fuel ratio A/F of the gas flowing into the catalyst is made closer to the stoichiometric air-fuel ratio than that of the conventional example. Accordingly, the NOx reduction action of the catalyst 44 is promoted, and deterioration of the emissions can be curbed. Also, the significant reduction of the amount of air fed to the catalyst 44 leads to an effect of curbing deterioration of the catalyst 44 itself. With the throttle opening θth thus made equal to zero (with the electronic throttle valve 40 thus fully closed), a secondary effect of reducing a pumping loss of the engine 12 during the partial fuel cut control can be obtained, without providing the engine 12 with a valve deactivating mechanism for holding valves of the fuel cut-off cylinders in fully closed positions. In addition, the command value is generated so that the actual value of the throttle opening θth would have already been equal to zero before the start of the partial fuel cut control, and the command value for returning the throttle opening θth to the original value is generated after the partial fuel cut control is finished; therefore, abrupt torque variations are less likely to occur due to the partial fuel cut control. Also, the control for retarding the ignition timing of the engine 12 may not be required to be executed for suppressing the abrupt torque variations, or the retard amount may be reduced, whereby the engine efficiency is less likely or unlikely to be reduced.

In a comparative example indicated by broken lines in FIG. 6, when partial fuel cut control is performed during an inertia phase of a power-on upshift, for example, the throttle opening θth during the partial fuel cut control is increased so as to compensate for a part of the amount of torque reduction due to the partial fuel cut control, using the combustion cylinders. On the other hand, in this embodiment indicated by solid lines, the amount of increase of the throttle opening θth during the partial fuel cut control is controlled to be smaller than that of the comparative example. Thus, in the comparative example, the air-fuel ratio A/F of the gas flowing into the catalyst becomes leaner due to the increase of the throttle opening θth in addition to the partial fuel cut control. In this embodiment, on the other hand, the amount of air fed to the catalyst 44 is reduced, and, even under the partial fuel cut control, the air-fuel ratio A/F of the gas flowing into the catalyst is made closer to the stoichiometric air-fuel ratio, as compared with that of the comparative example.

As described above, according to this embodiment, even when the torque of the engine 12 is reduced through the partial fuel cut control during the inertia phase of the power-on upshift of the automatic transmission 18, the amount of air fed to the catalyst 44 via the fuel cut-off cylinder(s) is reduced, as compared with the case where the control for reducing the throttle opening θth during execution of torque down control is not performed; therefore, the air-fuel ratio A/F of the gas flowing into the catalyst is less likely to be leaner or increased. It is thus possible to reduce an influence on the emissions when the torque of the engine 12 is reduced through the partial fuel cut control during the inertia phase of the power-on upshift.

According to this embodiment, the control for reducing the throttle opening θth during execution of the torque down control is started before the torque starts being reduced through the partial fuel cut control, and the control for reducing the throttle opening θth during execution of the torque down control is finished after the end of the torque reduction. Therefore, torque variations due to the torque reduction through the partial fuel cut control are reduced, and shocks can be alleviated.

Next, a second embodiment of the invention will be described. In the following description, the same reference numerals are assigned to components or portions common to the first embodiment as described above and the following embodiment, and these components or portions will not be further explained.

In the above-described first embodiment, the control for reducing the throttle opening θth during torque reduction through partial fuel cut control is performed so as to prevent the air-fuel ratio A/F of the gas flowing into the catalyst from becoming leaner or being increased. In the second embodiment, a known NOx storage reduction type three-way catalyst that temporarily stores NOx in a lean air-fuel ratio region (namely, when the air-fuel ratio A/F of the gas flowing into the catalyst is lean), while keeping the function of the three-way catalyst, is used as the catalyst 44. When the NOx storage reduction type three-way catalyst is used, it is considered that an influence on the emissions is increased since the catalyst 44 fails to convert or remove NOx, when a large amount of NOx is stored (deposited) on the catalyst 44, and the catalyst 44 has a reduced capability of adsorbing NOx. Thus, in this embodiment, the engine output controller 72 reduces the throttle opening θth by a larger degree as the amount of NOx deposited on the catalyst 44 is larger, in the control for reducing the throttle opening θth during execution of torque down control through partial fuel cut control. The engine output controller 62 calculates the amount of NOx deposited on the catalyst 44, from a predetermined relationship (map) or formula for obtaining the deposition amount, for example, based on a period of time for which the gas flowing into the catalyst is in a lean state in which NOx is temporarily stored in the catalyst, a period of time for which the gas is in a stoichiometric to rich state in which NOx is reduced, the intake air amount Qair of the engine 12 (corresponding to the amount of exhaust gas EX), and so forth.

In the case where the NOx storage reduction type three-way catalyst as described above is used, if the catalyst 44 is able to adsorb NOx even when the air-fuel ratio A/F of the gas flowing into the catalyst is lean, deterioration of the emission due to the failure to convert or remove NOx is avoided. Therefore, if the catalyst 44 has a sufficient ability to adsorb NOx, it is considered unnecessary to uniformly execute the control for reducing the throttle opening θth, even during the partial fuel cut control.

Thus, in this embodiment, the engine output controller 72 executes the control for reducing the throttle opening θth during execution of torque down control through the partial fuel cut control when the amount of NOx deposited on the catalyst 44 is large, and does not execute the control for reducing the throttle opening θth when the amount of NOx deposited on the catalyst 44 is small.

Figure 7:
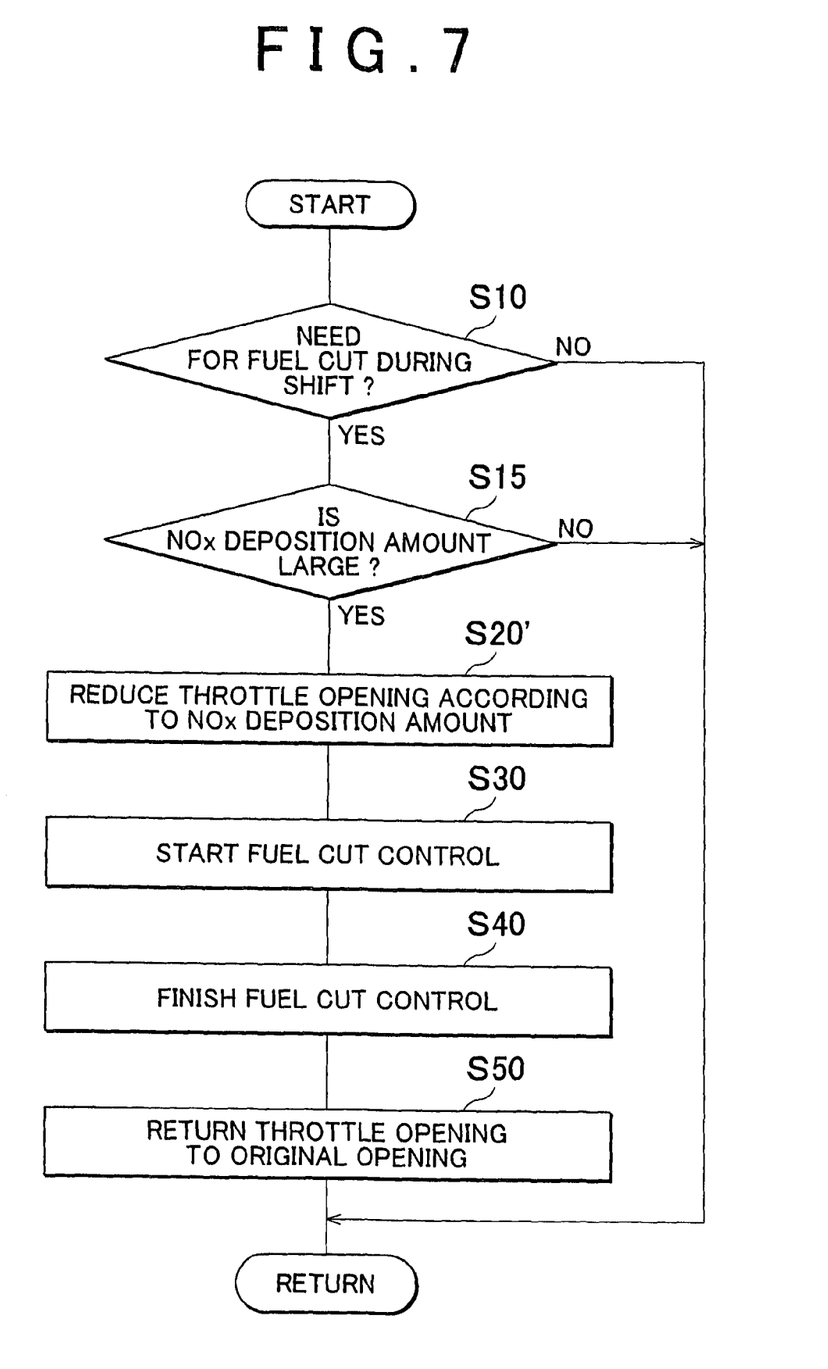
FIG. 7 is a flowchart, corresponding to the flowchart of FIG. 4, explaining a principal part of control operations of the electronic control unit, namely, explaining control operations for reducing an influence on emissions when engine torque is reduced through partial fuel cut control during an inertia phase of a power-on upshift.

FIG. 7 is a flowchart explaining a principal part of control operations of the electronic control unit 70, namely, control operations for reducing, an influence on the emissions when engine torque is reduced through partial fuel cut control, during an inertia phase of a power-on upshift of the automatic transmission 18. The control flow of FIG. 7 is repeatedly executed in short cycles of, for example, several milliseconds to several tens of milliseconds. FIG. 7 corresponds to the flowchart shown in FIG. 4, and the same control operations are performed in steps having the same step numbers as those of FIG. 4.

In FIG. 7, it is initially determined in step S10 whether partial fuel cut control needs to be performed during an inertia phase of a power-on upshift, for example. If a negative decision (NO) is made in step S10, the current cycle of the routine ends. If an affirmative decision (YES) is made in step S10, it is determined in step S15 corresponding to the engine output controller 72 whether the amount of NOx deposited on the catalyst 44 is large, depending on whether the calculated amount of NOx deposited on the catalyst 44 exceeds a given deposition amount as a predetermined upper limit of deposition amount with which the catalyst 44 has a sufficient ability to adsorb NOx. If a negative decision (NO) is made in step S15, the control for reducing the throttle opening θth during execution of torque down control through the partial fuel cut control is not performed, and the current cycle of the routine ends. If an affirmative decision (YES) is made in step S15, on the other hand, the control for reducing the throttle opening θth during execution of torque down control through the partial fuel cut control is performed, in step S20' corresponding to the engine output controller 72. In this case, the throttle opening θth is reduced by a larger degree as the amount of NOx deposited on the catalyst 44 is larger. Then, after the partial fuel cut control is performed in steps S30-S50, the control started in the above step S20' for reducing the throttle opening θth is finished, and the throttle opening θth is returned to the original opening.

As described above, the second embodiment yields substantially the same effect as that of the first embodiment as described above. In addition, the catalyst 44 is the NOx storage reduction type three-way catalyst, and the throttle opening θth is reduced by a larger degree as the amount of NOx deposited on the catalyst 44 is larger, in the control for reducing the throttle opening θth during execution of torque down control through the partial fuel cut control. Therefore, when the amount of NOx deposited on the catalyst 44 is large, the electronic throttle valve 40 can be controlled so that the gas flowing into the catalyst does not become leaner.

According to this embodiment, the control for reducing the throttle opening θth during execution of torque down control through the partial fuel cut control is performed when the amount of NOx deposited on the catalyst 44 is large, whereas the control for reducing the throttle opening θth during execution of torque down control is not performed when the amount of NOx deposited on the catalyst 44 is small. Therefore, when the amount of NOx deposited on the catalyst 44 is small, an influence on the emissions can be reduced even if the control for reducing the throttle opening θth during execution of torque down control is not performed, since a large amount of NOx can be adsorbed by the catalyst 44. In addition, when the amount of NOx deposited on the catalyst 44 is small, the throttle opening θth can be kept at the same value or increased so as to compensate for at least a part of the amount of torque reduction under the fuel cut control, by means of the combustion cylinders, thus making it possible to alleviate shocks that would be caused by excessive torque reduction, for example.

While the embodiments of the invention have been described in detail referring to the drawings, the invention may be applied in other forms.

While each of the above-described embodiments is implemented independently of each other, each of the above embodiments is not necessarily implemented independently of each other, but these embodiments may be combined as appropriate and implemented.

In the time chart shown in FIG. 5 of the above-described first embodiment, the throttle opening θth is made equal to zero (i.e., the electronic throttle valve 40 is fully closed) during the partial fuel cut control. It is, however, to be understood that this is a mere example when the throttle opening θth is reduced.

While the control for reducing the throttle opening θth is performed during the partial fuel cut control in the above-described embodiments, the effect of curbing deterioration of the catalyst 44 itself may be obtained even when the control for reducing the throttle opening θth is performed during all-cylinder fuel cut control.

While the catalyst 44 is a three-way catalyst (which may be a NOx storage reduction type three-way catalyst) in the above-described embodiments, the invention is not limited to this arrangement. For example, an oxidation catalyst and a NOx reduction catalyst (such as a NOx storage reduction catalyst) may be respectively provided in the exhaust pipe 34.

It is to be understood that the above-described embodiments are merely exemplary, and the invention may be embodied with various changes, modifications, and improvements, based on the knowledge of those skilled in the art.

The invention claimed is:

1. A control system for a vehicle including an engine having a plurality of cylinders, a catalyst provided in an exhaust pipe of the engine, and an automatic transmission that transmits power from the engine toward driving wheels, the system comprising:
   an electronic control unit configured to:
   (i) perform torque down control to reduce torque of the engine by cutting off fuel supply to at least one of the cylinders of the engine during an inertia phase of a power-on upshift,
   (ii) to perform a control for reducing a throttle opening during execution of the torque down control when an amount of nitrogen oxides deposited on the catalyst is larger than a given value, and
   (iii) reduce the throttle opening by a larger degree during execution of the torque down control as the amount of nitrogen oxides deposited on the catalyst increases.

2. The control system according to claim 1, wherein the catalyst comprises a catalyst that temporarily stores nitrogen oxides in a lean air-fuel ratio region.

3. The control system according to claim 1, wherein the electronic control unit is configured not to perform the control for reducing the throttle opening during execution of the torque down control when the amount of nitrogen oxides deposited on the catalyst is equal to or smaller than the given value.

4. The control system according to claim 1, wherein the electronic control unit is configured to start the control for reducing the throttle opening during execution of the torque down control before the torque down control is started, and finish the control for reducing the throttle opening during execution of the torque down control after the torque down control is finished.

5. A control method for a vehicle including an engine having a plurality of cylinders, a catalyst provided in an exhaust pipe of the engine, and an automatic transmission that transmits power from the engine toward driving wheels, an electronic control unit, the method comprising:
- reducing, by the electronic control unit, a torque of the engine by cutting off fuel supply to at least one of the cylinders of the engine during an inertia phase of a power-on upshift,
- reducing, by the electronic control unit, a throttle opening during reducing the torque when an amount of nitrogen oxides deposited on the catalyst is larger than a given value, and
- reducing, by the electronic control unit, the throttle opening by a larger degree during reducing the torque as an amount of nitrogen oxides deposited on the catalyst is larger, or reducing, by the electronic control unit, the throttle opening during reducing the torque until the throttle opening becomes smaller than a throttle opening including an amount by which the throttle opening is increased so as to compensate for at least a part of the amount of torque reduction due to fuel cut-off, with use of a cylinder to which the fuel continues to be supplied.

6. A control system for a vehicle including an engine having a plurality of cylinders, a catalyst provided in an exhaust pipe of the engine, and an automatic transmission that transmits power from the engine toward driving wheels, the system comprising:
an electronic control unit configured to:
(i) perform torque down control to reduce torque of the engine by cutting off fuel supply to at least one of the cylinders of the engine during an inertia phase of a power-on upshift,
(ii) perform a control for reducing a throttle opening during execution of the torque down control when an amount of nitrogen oxides deposited on the catalyst is larger than a given value, and
(iii) reduce the throttle opening during execution of the torque down control until the throttle opening becomes smaller than a throttle opening including an amount by which the throttle opening is increased so as to compensate for at least a part of the amount of torque reduction due to fuel cut-off, with use of a cylinder to which the fuel continues to be supplied.

* * * * *